(12) United States Patent
Hellkvist

(10) Patent No.: US 7,631,880 B2
(45) Date of Patent: Dec. 15, 2009

(54) SEAL FOR A CABLE ENTRY, PIPE PENETRATION OR THE LIKE

(75) Inventor: Joakim Hellkvist, Nattraby (SE)

(73) Assignee: Roxtec AB, Karlskrona (SE)

( * ) Notice: Subject to any disclaimer, the term of this patent is extended or adjusted under 35 U.S.C. 154(b) by 68 days.

(21) Appl. No.: 10/792,723

(22) Filed: Mar. 5, 2004

(65) Prior Publication Data

US 2004/0169341 A1 Sep. 2, 2004

(30) Foreign Application Priority Data

Sep. 21, 2001 (SE) ................... 0103144-2

(51) Int. Cl.
*F16L 21/05* (2006.01)
(52) U.S. Cl. ..................... 277/654; 277/628
(58) Field of Classification Search ............... 277/606, 277/628, 654
See application file for complete search history.

(56) References Cited

U.S. PATENT DOCUMENTS

| 3,528,668 A | 9/1970 | Barton |
| 3,775,204 A * | 11/1973 | Thompson et al. ............. 156/53 |
| 5,697,194 A | 12/1997 | Gignac et al. |
| 2009/0130891 A1* | 5/2009 | Milton ....................... 439/373 |

FOREIGN PATENT DOCUMENTS

| CN | 201032680 | * | 3/2008 |
| DE | 0429916 | | 11/1990 |
| GB | 2186443 | | 8/1987 |
| JP | 3177680 | | 8/1991 |
| JP | 8184167 | | 7/1996 |
| JP | 2513816 | | 10/1996 |
| JP | 2000-320736 | | 11/2000 |
| WO | WO 2007/126378 | * | 11/2007 |
| WO | WO 2009/025615 | * | 5/2009 |

* cited by examiner

*Primary Examiner*—Frederick L Lagman
(74) *Attorney, Agent, or Firm*—Harness, Dickey & Pierce, P.L.C.

(57) ABSTRACT

The present invention concerns a seal for a cable entry, pipe penetration or the like formed of two halves. The seal is to be received in a sleeve or the like and forms a central opening for a cable (7), pipe or the like when the seal halves are brought together. The outer diameter of the seal is variable to be adapted to different mounting dimensions. To adapt the outer diameter of the seal to the mounting dimension of the sleeve, a number of outer peeling sheets (5) are arranged on the outside of the seal. The sheets (5) adhere to each other but may be peeled off by hand.

10 Claims, 1 Drawing Sheet

SEAL FOR A CABLE ENTRY, PIPE PENETRATION OR THE LIKE

TECHNICAL FIELD

The present invention concerns a cable entry seal, pipe penetration seal or the like.

Seals of the above type are used in a lot of different embodiments and are to seal against various things. They may have to seal against fluid, gas, fire, rodents, termites etc. The seal may receive cables for electricity, communication, computers etc. or pipes for different gases or liquids such as water, compressed air, hydraulic fluid and cooking gas.

The expressions "seal" and "sleeve" are used to simplify the description and are to be construed broadly. "Seal" is used for any type of cable entry seal, pipe penetration seal or the like. "Sleeve" is to cover any pipe, tubing, sleeve or the wall itself where the seal is to be received.

PRIOR ART

Seals of this type are normally received in a sleeve in a wall. Often there is a pressure difference of great magnitude on the opposing sides of the wall. Thus, to function in the desired way the seal must fit snugly into the sleeve or the like in which it is received and the seal must be adapted to the actual mounting dimension. The mounting dimension is dictated by the inner diameter of the sleeve.

The sleeves of the prior art are often made of standard tubes or pipes having different inner diameters. Depending of the geographical location and the actual field of use the standard may vary, which means that seals must be furnished that can be used for all different dimensions. Furthermore, the sleeves should have a relatively smooth inner surface not to hinder an adequate sealing.

In one previously known seal according to the prior art a special sleeve has been developed and furnished with each sold seal. This has functioned well in that respect that the seal has been tight, but there have also been some problems. The sleeve has meant a further part to be stored and transported. Further an opening of the wall or the like has to be adapted to the outer dimension of the sleeve. In some cases it has been difficulties in adapting the opening of the wall to the actual sleeve. For embodiments not having a special sleeve a number of different seals have to be provided, to cover a wide range of possible dimensions of the sleeve.

Furthermore the cables, pipes or the like that should be fitted in the seal may be of many different sizes.

THE INVENTION

One object of the present invention is to be able to adapt one single seal for many different mounting dimensions, in order to reduce the number of different seals needed to cover a wide range.

This object is met by a seal for a cable entry, pipe penetration or the like formed of two halves. The seal is to be received in a sleeve or the like and forms a central opening for a cable, pipe or the like when the seal halves are brought together. The outer diameter of the seal is variable to be adapted to different mounting dimensions.

On the outside of the seal a number of peeling sheets are arranged, to adapt the outer diameter of the seal to the mounting dimensions of the sleeve. Also on the inner diameter of the seal a number of peeling sheets are arranged, to adapt the inner diameter of the seal to the diameter of a cable, pipe or the like received in the seal. Said inner and outer peeling sheets may be peeled off by hand.

Further objects and advantages of the present invention will be obvious to a person skilled in the art from reading the detailed description below of preferred embodiments.

BRIEF DESCRIPTION OF THE DRAWINGS

The invention will be described more closely below by way of an example and with reference to the enclosed drawings. In the drawings.

DETAILED DESCRIPTION OF PREFERRED EMBODIMENTS

Figure 3:
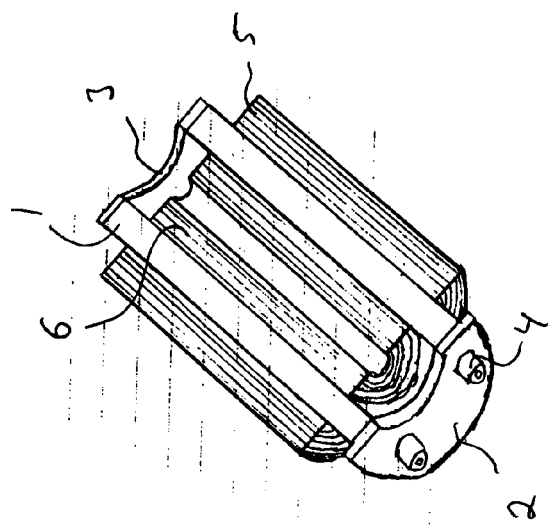
FIG. 3 is a perspective view of one half of a seal corresponding to the seal of FIGS. 1 and 2.
Figure 2:
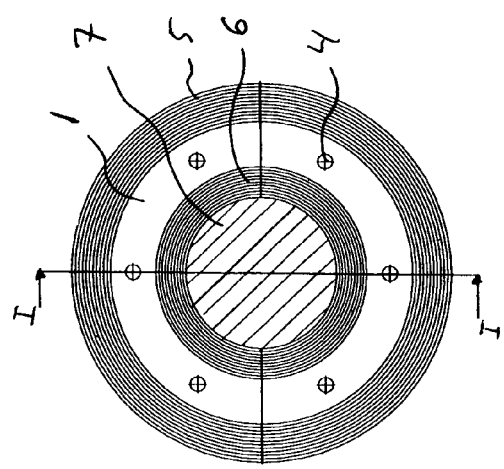
FIG. 2 is a sectional view of the seal of FIG. 1 taken along the lines II-II of FIG. 1.
Figure 1:
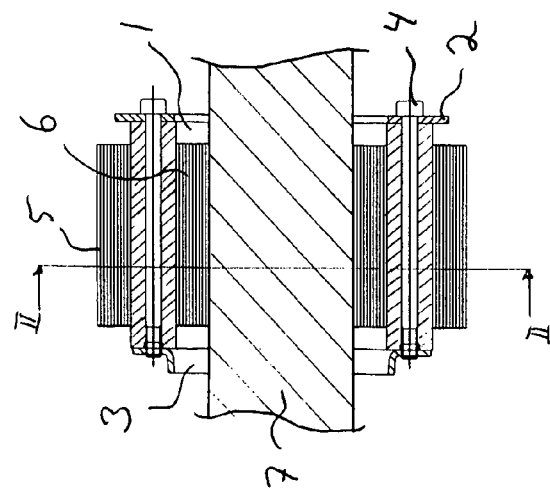
FIG. 1 is a sectional view of a seal according to the invention taken along the lines I-I of FIG. 2.

The seal of the present invention may be used as a cable entry seal, a pipe penetration seal or the like. It is formed of two identical parts, which in use are brought together to form the seal. Each seal half has a base part 1 of an elastic material. At the ends of the base part a front plate 2 and a back plate 3 are arranged. Said plates 2, 3 are held at the base part 1 by means of screws 4. Openings are arranged in the plates 2, 3 and the base part 1 to receive the screws 4. The screws 4 are threaded at their outer ends to co-operate with threaded openings of the back plate 3. The function of the screws 4 co-operating with the plates 2, 3 is to compress the base part 1 in an axial direction. Even tough three screws are used at each seal half in the shown embodiment, any number of screws may be used. In the shown embodiment the screws 4 are of the type socket head cap screws. A person skilled in the art realises that any type of fastening means allowing the plates 2, 3 to be moved towards each other may be used. Thus, it is possible to use screws and nuts. Preferably, the screws should be possible to tighten from one side.

The front plate 2 according to the shown embodiment, is the plate on that side of the base part 1 from which the screws 4 normally are manipulated. The back plate 3 is placed on the opposite side to the front plate 2. In many embodiments the front plate 2 is given an outer radius exceeding the inner diameter of the sleeve. This is done for a more precise placing of the seal, as the front plate 2 will abut the end of the sleeve. In stead of the radius of the front plate 2 exceeding the inner dimension of the sleeve, a number of extended parts fixed to or integrated with said plate 2 may extend over the inner radius of the sleeve.

Peeling sheets 5, 6 are arranged both on the outside and inside of the base part 1. The peeling sheets 5, 6 are made in such a way and of a material allowing them to stick together after production of each seal half. However, they adhere so loosely to each other that they may be peeled off by hand.

The base parts 1 have normally a somewhat larger axial extent than the outer and inner peeling sheets 5, 6 in order to enable the base parts 1 to be compressed in the axial direction without hindrance from the peeling sheets 5, 6.

The two seal halves are formed to have a central, cylindrical open space when brought together. A cable, pipe or the like is to be received in said open space. In the shown example a cable 7 is received in the seal. A person skilled in the art realises that the seal may also be adapted to receive more then one cable 7, pipe or the like. In the latter case it is possible to receive different kinds of cables, pipes etc. Normally, the seal is received in a sleeve, tube or the like of some kind of wall, which sleeve is fixed to the wall. In other embodiments the wall may be formed to receive the seal.

In use the two seal halves are to be placed around the cable 7 or the like. To adapt the seal to the diameter of the cable 7 one or more of the inner sheets 6 are peeled off. To adapt the outer diameter of the seal to the sleeve or the like one or more of the outer sheets 5 are peeled off.

When the appropriate number of inner and/or outer sheets 5, 6 have been peeled off the seal is placed in the available space surrounding the cable 7 or the like. Then the screws 4 are turned in such a way that the front and back plates 2, 3 will be moved towards each other. As the plates 2, 3 move towards each other the base parts 1 are compressed in the axial direction. The axial compression of the base parts 1 leads to an expansion of the base parts 1 in the radial direction. The base parts 1 will expand radially both inwards and outwards and, thus, seal both outwards towards the available space and inwards towards the cable 7. The expansion of the base parts 1 is transferred from the base parts 1 by means of the outer and inner peeling sheets 5, 6. The base parts 1 together with the outer peeling sheets 5 will fill out any irregularity in the inner wall of the sleeve.

The thickness of each outer peeling sheet 5 is adapted to the elasticity of the base parts 1, or more precisely the range of clearance expected to be possibly taken up by the base parts 1. The thickness of each single peeling sheet 5 should be less than the expected maximal radial expansion of the base parts 1. The number of peeling sheets is adapted to the intended use and to the desired range of outer diameters of the seal. In one example there are twelve outer peeling sheets 5. Normally between two and twenty outer peeling sheets 5 are provided, even tough also other numbers may be considered. The actual number depends on the dimensions, the intended use etc. A normal thickness of the outer sheets 5 is 0.5 to 2.0 mm. However, a person skilled in the art realises that depending on the actual size of the seal the thickness may vary further.

In some embodiments two seals are arranged at each end of a longer sleeve. This may be advantageously e.g. concerning fire protection. Furthermore, the seal is often supplied having a plug (not shown) in the space intended for the cable 7 or the like. The plug will protect the seal in different connections and it is often used if the seal is mounted in advance of the cable 7 or the like.

Even though the seal has been shown having a circular cross section, a person skilled in the art realises that the seal of the present invention may have any cross section form. Thus, it may be oval, square, rectangular, polygon etc.

The invention claimed is:

1. A seal for a cable entry or pipe penetration, said seal being received in a sleeve, the seal comprising
   two halves forming at least one central opening for the cable or pipe when the seal halves are brought together, wherein an outer diameter of the seal is variable to be adapted to different mounting dimensions, wherein the outer diameter of the seal is furnished with a number of peeling sheets.

2. The seal according to claim 1, wherein each seal half has a base part made of an elastic material.

3. The seal according to claim 2, wherein a front plate and a back plate respectively is arranged at each end of the base part, the plates being connected to each other by means of screws received in through openings of the base part.

4. The seal according to claim 3, wherein the base parts are compressed axially and expand radially when the front plates and back plates are brought in a direction towards each other.

5. The seal according to claim 1, wherein the seal has a basically cylindrical design.

6. The seal according to claim 1, wherein the outer peeling sheets stick to each other in a loose way, allowing the sheets to be peeled off.

7. The seal according to claim 1, wherein a number of outer peeling sheets is between two and twenty.

8. The seal according to claim 4, wherein the thickness of each outer peeling sheet is less than the expected maximal radial expansion of the base parts.

9. The seal according to claim 8, wherein the thickness of each outer peeling sheet is between 0.5 and 2.0 mm.

10. The seal according to claim 2, wherein inner peeling sheets are arranged on the inner side of each base part to vary the inner diameter of each central opening.

* * * * *